(12) United States Patent
Kondo

(10) Patent No.: US 6,603,796 B1
(45) Date of Patent: Aug. 5, 2003

(54) RADIO COMMUNICATION SYSTEM AND TRANSMISSION AND/OR RECEPTION APPARATUS FOR USE IN THE SYSTEM

(75) Inventor: Seiji Kondo, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/265,835

(22) Filed: Mar. 10, 1999

(30) Foreign Application Priority Data

Mar. 20, 1998 (JP) .......................................... 10-071822

(51) Int. Cl.$^7$ ................................................. H04B 1/69
(52) U.S. Cl. ........................ 375/130; 375/141; 714/748; 370/342
(58) Field of Search ................................ 375/130, 135, 375/136, 140, 141, 147, 211, 219, 146; 370/320, 335, 342, 204, 228, 208; 714/748

(56) References Cited

U.S. PATENT DOCUMENTS

| | | | |
|---|---|---|---|
| 5,345,600 A | | 9/1994 | Davidson .................... 455/501 |
| 5,701,427 A | | 12/1997 | Lathrop ....................... 709/237 |
| 5,930,230 A | * | 7/1999 | Odenwalder et al. ........ 370/208 |
| 6,084,851 A | * | 7/2000 | Iwasaki ....................... 370/204 |
| 6,101,168 A | * | 8/2000 | Chen et al. ................... 370/228 |
| 6,145,108 A | * | 11/2000 | Ketseoglou .................. 714/751 |
| 6,157,628 A | * | 12/2000 | Uebayashi et al. .......... 370/335 |

FOREIGN PATENT DOCUMENTS

| | | |
|---|---|---|
| EP | 0 635 952 | 1/1995 |
| EP | 0 735 701 | 10/1996 |
| WO | WO 97/16044 | 5/1997 |

OTHER PUBLICATIONS

Addendum 1: Data transmission and protocol.
Addendum 2: Analog and digital transmission.

* cited by examiner

*Primary Examiner*—Stephen Chin
*Assistant Examiner*—Chieh M. Fan
(74) *Attorney, Agent, or Firm*—Young & Thompson

(57) ABSTRACT

A radio communication system includes a transmission apparatus and a reception apparatus, enabling to retransmit a frame which has caused a code error in the CDMA method, without lowering the transmission capacity. The transmission apparatus includes: an encoder for encoding an information to be transmitted and adding an error detection code; a storage; a transmission channel; a first multiplier provided in the transmission channel, for multiplying an output signal from the encoder by a first diffusion code so as to be a transmission signal destined to the reception apparatus; a second multiplier for multiplying a signal received from the reception apparatus, by a second diffusion code; a decoder for decoding the output signal from the second multiplier; and a transmission/reception block. The reception apparatus includes: a first multiplier for multiplying a reception signal from the transmission apparatus, by the first diffusion code; a decoder for decoding an output signal from the first multiplier and checking whether the reception signal contains a code error according to the error detection code; an encoder for encoding a retransmission request identifying a frame number which has caused a code error if any detected by the decoder; a second multiplier for multiplying an output signal from the encoder, by the second diffusion code, so as to be a transmission signal destined to the transmission apparatus; and a transmission/reception block.

6 Claims, 10 Drawing Sheets

RADIO COMMUNICATION SYSTEM AND TRANSMISSION AND/OR RECEPTION APPARATUS FOR USE IN THE SYSTEM

BACKGROUND OF THE INVENTION

1. Field of the Invention

The present invention relates to a radio communication system and a transmission apparatus and a reception apparatus for use in this system, and in particular to a radio communication system of CDMA (code division multiple access) and a transmission apparatus and a reception apparatus for use in the system.

2. Description of the Related Art

Conventionally, in the CDMA method, a particular code is allocated for each channel and modulated waves of the same carrier frequency are spectrum-dispersed with this code, so that a reception side can recognize a desired channel by code synchronization.

Firstly, a conventional radio communication system will be explained with reference to FIG. 7 to FIG. 10.

The radio communication system is constituted by a repeating apparatus serving as a transmission apparatus 50 and a reception apparatus 60.

FIG. 8 shows a configuration of the repeating apparatus 50. An information item from the line is frame-divided and encoded by an encoder 51, after which a resultant signal is multiplied by a first diffusion code in a multiplier 52. The signal which has been multiplied by the first diffusion code is adjusted in a controller 53 so as to be a maximum gain, which is supplied to an adder 54. Here, the encoder 51 stores the output information in its internal storage. Moreover, the encoder 51 adds an error detection code (such as CRC) to each of the frames before output. The adder 54 performs an addition of signals from a plurality of channels. A resultant signal of this addition is transmitted via a transmitter 55 from an antenna 56.

FIG. 9 shows a configuration of the reception apparatus 60. A signal received via an antenna 61 by a receiver 62 is multiplied by a first diffusion code in a multiplier 63 and decoded in a decoder 64, and then processed by a data terminator 65. Here, in the decoder 64, the error detection code added to the received information is checked. If an error is detected, the error information is added to the reception information, which is supplied to an encoder 66 without passing through the data terminator. This retransmission request indicating a code error is coded by the encoder 66 and multiplied by a second diffusion code, after which the request is transmitted via a transmitter 68 from the antenna 61. Moreover, a transmission information generated from the data terminator 65 is also transmitted from the antenna 61 via the encoder 66, the multiplier 67, and the transmitter 68.

Referring again to FIG. 8, explanation will be continued. The retransmission request and other information transmitted from the reception apparatus 60 are received by the repeating apparatus 50. A signal which has reached the antenna 56 is fetched by the receiver 57 and multiplied by a second diffusion code by the multiplier 58 before decoded by the decoder 59. If it is found in the decoding that the reception information contains a bit indicating the code error of the information transmitted, the decoder 59 makes a retransmission request to the encoder 51. Upon reception of the retransmission request, the encoder 51 retransmits using the first diffusion code the frame which has been retained in the storage. Upon reception of the retransmitted frame, the reception apparatus 60 performs a check whether a code error is contained. If no error is contained, the frame is supplied to the data terminator 65. The data terminator 65 processes frames in the order of the frame number.

For example, as shown in FIG. 10, if a code error has occurred in transmission of frame No. 1, a frame indicating a retransmission request is returned from the reception apparatus, during which a frame No. 2 is transmitted from the repeater apparatus 50. At this point of time, the repeater apparatus 50 which has received the retransmission request for the frame No. 1 interrupts transmission of frame No. 3 and transmits the frame No. 1. After this, transmission of the frame No. 3 and after is continued. In the reception apparatus 60, information is processed in the order of the frame number. This assures reliability of the communication between the repeater apparatus 50 and the reception apparatus 60.

However, in the aforementioned conventional example, in the repeater apparatus, the same channel, i.e., the sample diffusion code is used for the normal transmission and the retransmission and accordingly, during the retransmission, the normal transmission operation should be interrupted. This lowers the transmission capacity (throughput). This problem is serious in the CDMA method which has originally a lower transmission capacity compared to the FDMA and TDMA.

SUMMARY OF THE INVENTION

It is therefore an object of the present invention to provide a radio communication system not causing a transmission capacity lowering even when retransmitting a frame which has caused in the CDMA method, as well as a transmission apparatus and a reception apparatus used in this system.

The radio communication according to the present invention comprises a transmission apparatus and a reception apparatus. The transmission apparatus includes: an encoder for encoding an information to be transmitted and adding an error detection code; a storage for storing a signal to be output from the encoder; a transmission channel for transmitting the information which has been encoded by the encoder so as to be transmitted; a first multiplier provided in the transmission channel, for multiplying an output signal from the encoder by a first diffusion code so as to be a transmission signal destined to the reception apparatus; a second multiplier for multiplying a signal received from the reception apparatus, by a second diffusion code; a decoder for decoding the output signal from the second multiplier; and a transmission/reception block for transmitting and receiving a signal to/from the reception apparatus. On the other hand, the reception apparatus includes: a first multiplier for multiplying a reception signal from the transmission apparatus, by the first diffusion code; a decoder for decoding an output signal from the first multiplier and checking whether the reception signal contains a code error according to the error detection code; an encoder for encoding a retransmission request identifying a frame number which has caused a code error if any detected by the decoder; a second multiplier for multiplying an output signal from the encoder, by the second diffusion code, so as to be a transmission signal destined to the transmission apparatus; and a transmission/reception block for transmitting and receiving a signal to/from the transmission apparatus.

Here, the decoder of the transmission apparatus has a function to instruct the encoder of the transmission apparatus, upon reception of a retransmission request from the reception apparatus, to retransmit the frame to be retransmitted. Moreover, the encoder of the transmission apparatus has a function, in response to the instruction of retransmission, to read out from the storage an information to be transmitted and a function to output the information to be retransmitted simultaneously with the information to be transmitted.

Furthermore, the transmission apparatus includes a retransmission channel for transmitting the information which has been read out from the storage by the encoder so as to be retransmitted, and a third multiplier provided in the retransmission channel, for multiplying an output signal from the encoder, by a third diffusion code so as to be a transmission signal destined to the reception apparatus. On the other hand, the reception apparatus further includes a third multiplier for multiplying a reception signal from the transmission apparatus, by the third diffusion code so as to be an input signal to the decoder of the reception apparatus.

In the radio communication system, it is preferable that the encoder of the transmission apparatus have a function for adding an error detection code to the information to be transmitted and outputting the information and that the decoder of the reception apparatus have a function to check whether a code error is present in the decoded information to be retransmitted.

According to another aspect of the present invention, there is provided a transmission apparatus for use in combination with a reception apparatus in a radio communication system, the transmission apparatus comprising: an encoder for encoding an information to be transmitted and adding an error detection code to the information encoded; a storage for storing a signal produced from the encoder; a transmission channel for transmitting the encoded information to be transmitted; a first multiplier provided in the transmission channel, for multiplying the output signal from the encoder by a first diffusion code so as to be transmission signal destined to the reception apparatus; a second multiplier for multiplying a signal received from the reception apparatus, by a second diffusion code; a decoder for decoding an output signal from the second multiplier; and a transmission/reception block for transmitting and receiving a signal to/from the reception apparatus.

Here the decoder has a function to instruct the encoder, upon reception of a retransmission request from the reception apparatus, to retransmit a frame requested to be retransmitted. Moreover, the encoder has a unction, in response to the instruction of retransmission, to read out from the storage an information to be transmitted and a function to output the information to be retransmitted simultaneously with the information to be transmitted.

The transmission apparatus further includes a retransmission channel for transmitting the information which has been read out from the storage by the encoder so as to be retransmitted, and a third multiplier provided in the retransmission channel, for multiplying an output signal from the encoder, by a third diffusion code so as to be a transmission signal destined to the reception apparatus.

In the transmission apparatus, it is preferable that the encoder have a function to add an error detection code to the information to be retransmitted, before outputting the information.

According to still another aspect of the present invention, there is provided a reception apparatus for use in combination with a reception apparatus in a radio communication system, the reception apparatus comprising: a first multiplier for multiplying a reception signal from the transmission apparatus by a first diffusion code; a decoder for decoding an output signal from the first multiplier and checking whether a code error is present in the reception signal according to an error detection code; an encoder for, upon detection of a code error in the decoder, encoding a retransmission request identifying a frame number which has caused the code error and outputting the retransmission request; a second multiplier for multiplying an output signal from the encoder by a second diffusion code so as to be transmission signal destined to the transmission apparatus; and a transmission/reception block for transmitting and receiving a signal to/from the transmission apparatus. Furthermore, the reception apparatus further comprises a third multiplier for multiplying the reception signal from the transmission apparatus by a third diffusion code so as to be an input signal to the decoder.

In the reception apparatus, it is preferable that the decoder have a function to check whether a code error is present in the decoded information to be retransmitted.

DESCRIPTION OF THE PREFERRED EMBODIMENTS

Description will now be directed to an embodiment of the present invention with reference to FIG. 1 to FIG. 5. Like components as in the conventional example are denoted with like symbols and their explanations are omitted.

The radio communication system according to the resent embodiment comprises a transmission apparatus 10 and a reception apparatus 20 for performing communication of the CDMA method.

Figure 1:
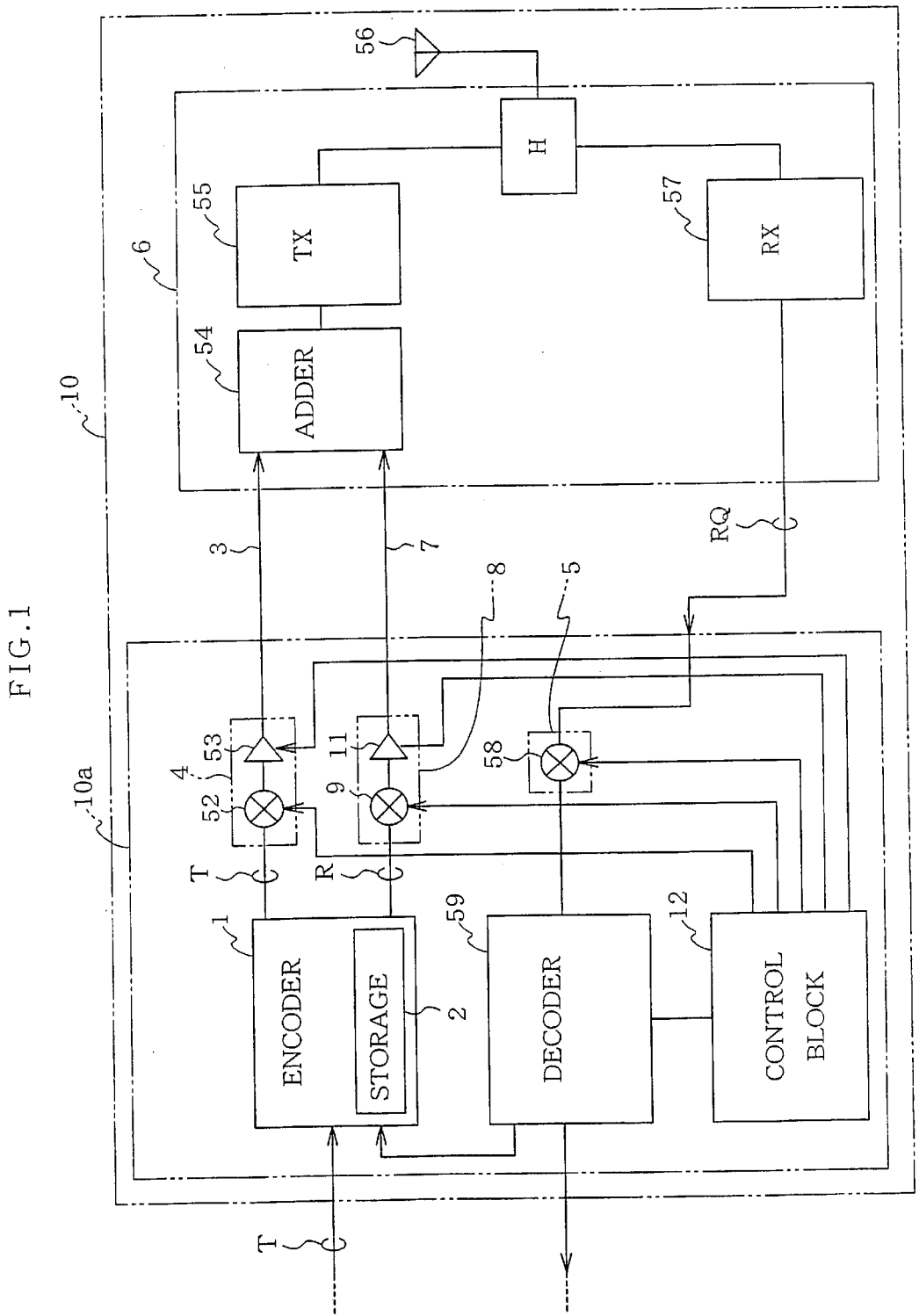
FIG. 1 is a block diagram showing a configuration of a transmission apparatus according to an embodiment of the present invention.

FIG. 1 shows a configuration of the transmission apparatus 10. The transmission apparatus 10 includes: an encoder 1 for encoding an information T to be transmitted and adding an error detection code; and a storage 2 for storing a signal to be output from the encoder 1. Moreover, the transmission apparatus 10 includes: a transmission channel 3 for transmitting the information T to be transmitted which has been encoded by the encoder 1; and a first multiplication block 4 provided in this transmission channel 3 for multiplying the output signal from the encoder 1 by a first diffusion code so as to obtain a transmission signal destined to the reception apparatus 20. Furthermore, the transmission apparatus 10 includes: a second multiplication block 5 for multiplying a signal received from the reception apparatus 20, by a second diffusion code; a decoder 59 for decoding the output signal from this second multiplication block 5; and a transmission/reception block for transmitting and receiving a signal to/from the reception apparatus 20. The decoder 59 has a function to cause the encoder 1 to retransmit a frame to be retransmitted upon reception of a retransmission request RQ from the reception apparatus 20. Moreover, the encoder 1 has a function, responsive to the indication of the retransmission, to read out from the storage 2 and output an information R to be retransmitted, and a function to simultaneously output the information R to be retransmitted together with the information T to be transmitted. The transmission apparatus 10 includes: a retransmission channel 7 for transmitting the information R which has been read out from the storage 2 by the encoder 1 so as to be retransmitted; and a third multiplication block 8 provided in this retransmission channel 7 for multiplying the output signal from the encoder 1, by a third diffusion code.

The aforementioned will be detailed below. In the present embodiment, the encoder 1 of the transmission apparatus 10 has a function for adding an error detection code to the information R to be retransmitted. The first multiplication block 4 includes a first multiplier for multiplying the coded information T to be transmitted, by the first diffusion code; and a gain controller 53 for adjusting the output from this multiplier 52 to be the maximum gain. The second multiplication block 5 has a second multiplier 58 for multiplying a received signal by the second diffusion code. The third multiplication block 8 includes a third multiplier 9 for multiplying the coded information R to be retransmitted, by the third diffusion code; and a gain controller 11 for adjusting the output from this third multiplier to be the maximum gain. The transmission/reception block 6 includes an adder 54 for performing addition of the output from the transmission channel 3 and the output from the retransmission channel 7; a transmitter 55 for transmitting the output from this adder 54 from an antenna 56; and a receiver 57 for receiving a signal from the reception apparatus 20 which has reached the antenna 56. A control block 12 serves to control operation of the aforementioned respective components and has a function to set predetermined diffusion codes for the respective multipliers 52, 9, 58 and a function to set predetermined gains for the respective gain controllers 53, 11. The gain controller 11 of the retransmission channel 7 is controlled to have the maximum gain when the coded information R is output from the encoder 1, and have no signal output from the gain controller when the information R to be retransmitted is not output. In FIG. 1, the symbol 10a denotes a channel controller.

Next, explanation will be given on the reception apparatus 20 with reference to FIG. 2. The reception apparatus 20 includes: a first multiplication block 21 for multiplying a received signal from the transmission apparatus 10, by a first diffusion code; and a decoder 22 for decoding the output signal from the first multiplication block 21 and checking whether the reception signal has a code error according to the error detection code. Moreover, the reception apparatus 20 includes: an encoder 66 for encoding a retransmission request RQ having a frame number which has caused a code error if any found in the decoder 22; a second multiplication block 23 for multiplying the output signal from the encoder 66, by a second diffusion code so as to be a transmission signal destined to the transmission apparatus 10; and a transmission/reception block 24 for transmitting and receiving a signal to/from the transmission apparatus 10. Furthermore, the reception apparatus 20 includes a third multiplication block 25 for multiplying the reception signal from the transmission apparatus 10, by a third diffusion code, so as to be an input signal to the decoder 22.

The aforementioned will be detailed below. In the present embodiment, the decoder 22 has a function to check a code error for the decoded information R to be retransmitted. The first multiplication block 21 has a first multiplier 63 for multiplying the reception signal by the first diffusion code. The second multiplication block 23 has a second multiplier 67 for multiplying the output signal from the encoder 66, by the second diffusion code. The third multiplication block 25 has a multiplier 26 for multiplying the reception signal from the transmission apparatus 10, by the third diffusion code. The transmission/reception block 24 includes: a transmitter 27 for outputting the output from the encoder 66, via the antenna 29; and a receiver 28 for receiving a signal from the transmission apparatus 10 which has reached the antenna 29. The reference symbol 31 denotes a data terminating block for processing a signal which has been decoded by the decoder 22. This data terminating block 31 also has a function to output a transmission signal to the transmission apparatus 10. A signal which is output from the data terminating block 31 is encoded by the encoder 66 and multiplied by the second diffusion code by the multiplier 67 before being transmitted by the transmitter 27 from the antenna 29. Moreover, the reference symbol 32 denotes a control block for controlling operation of these components and has a function to set predetermined diffusion codes for the respective multipliers 63, 67, and 26.

Figure 3:
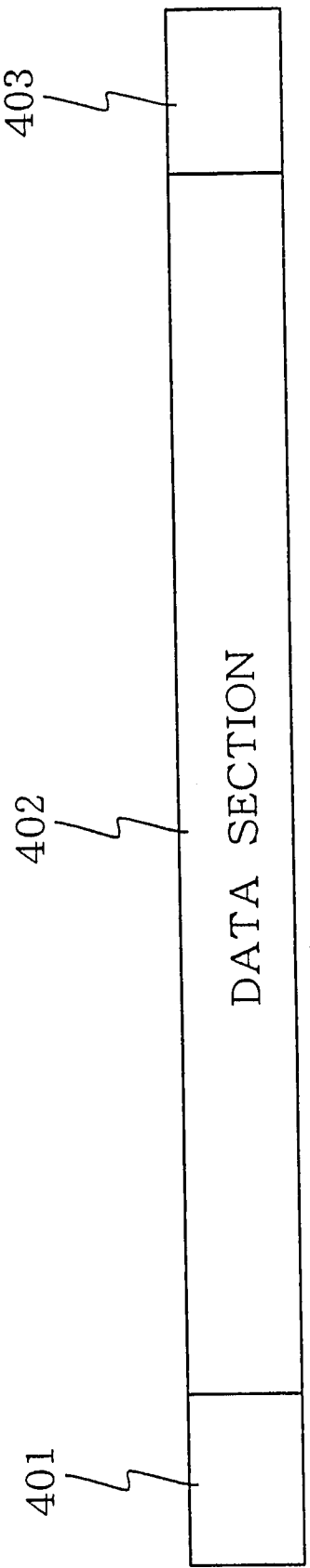
FIG. 3 shows a configuration of a frame passed between the transmission apparatus of FIG. 1 and the reception apparatus of FIG. 2.
Figure 4:
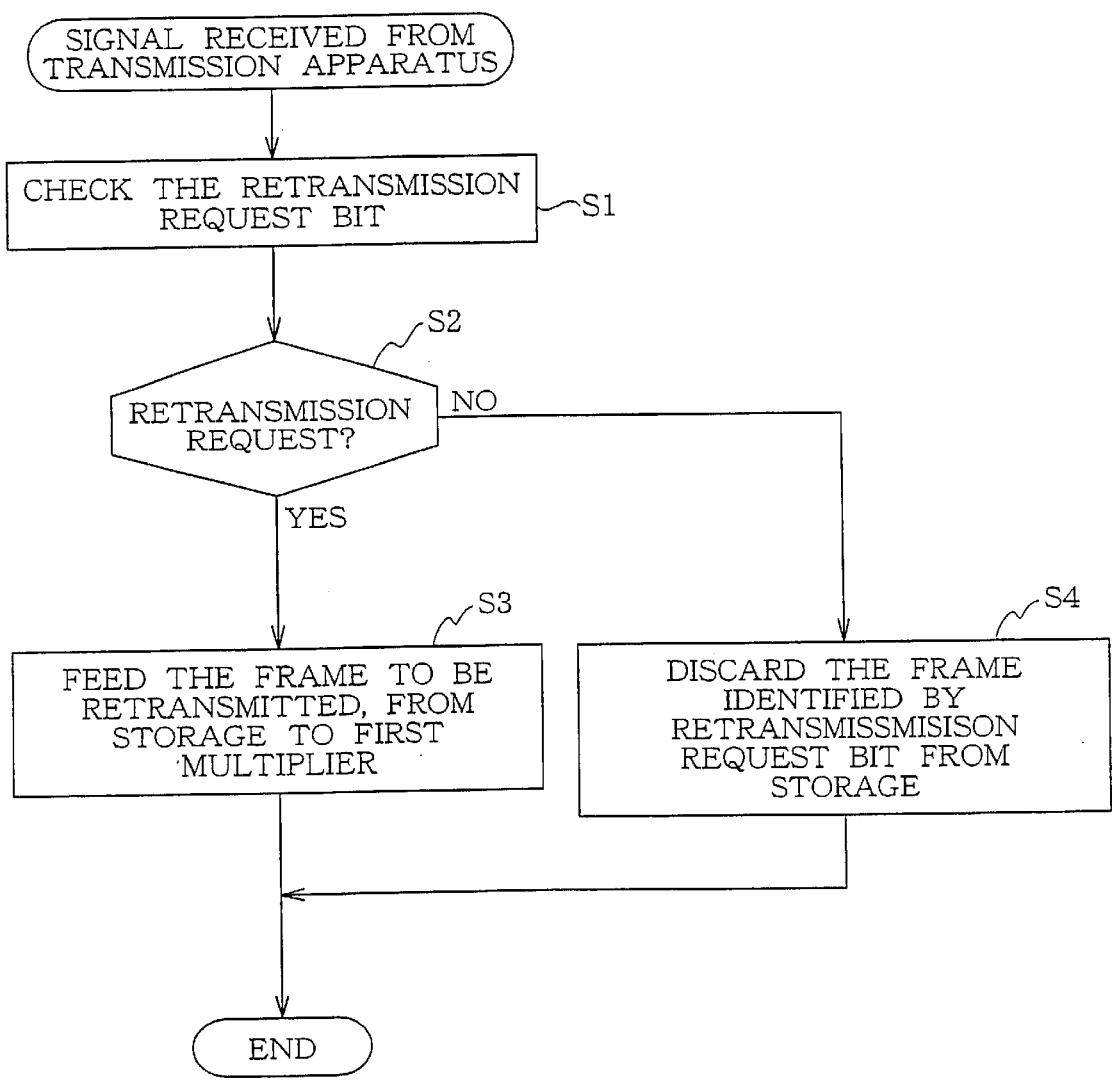
FIG. 4 is a flowchart showing a part of operation of the transmission apparatus.

FIG. 3 shows a configuration of a signal frame passed between the transmission apparatus 10 and the reception apparatus 20. The signal frame has a data section 402 preceded by a retransmission request bit 401 and followed by an error detection code 403. In a frame transmitted from the transmission apparatus 10, the data section 402 contains the information to be transmitted, to which a corresponding detection code 403 is added. When a code error is detected inn the reception apparatus 20, a retransmission request is set in the retransmission request bit 401 and the frame is transmitted back to the transmission apparatus 10.

Next, explanation will be given on operation of the present embodiment.

Referring to FIG. 1, when the encoder 1 is supplied with an information T to be transmitted, the encoder 1 encodes the information T and stores the information T in the data section 402 of the frame shown in FIG. 3. Moreover, the encoder 1 creates an error detection code corresponding to the information stored in the data section and adds the error detection code to the data section 402. This frame is stored in the storage 2 and output to the transmission channel 3. The signal output to the transmission channel 3 is multiplied by the first diffusion code by the first multiplier 52 and adjusted by the gain controller 53 so as to be the maximum gain. Here, the gain is controlled by the control block 12 so that no output is present from the gain controller 11 of the retransmission channel 7. The signal of the transmission channel 3 adjusted to be the maximum gain is fed to the adder 54 and then transmitted from the transmitter 55 via the antenna 56.

Figure 2:
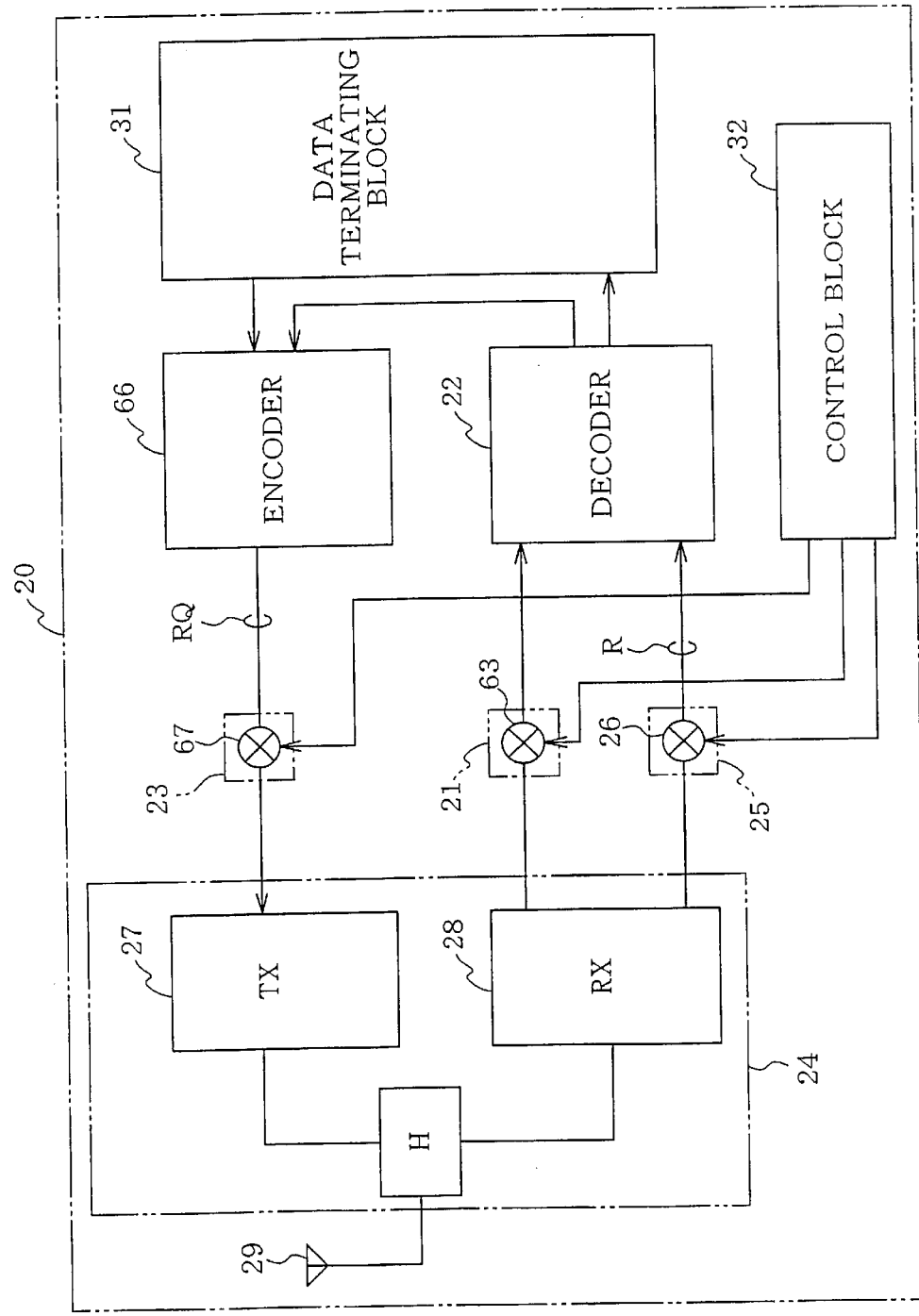
FIG. 2 is a block diagram showing a configuration of a reception apparatus according to an embodiment of the present invention.

This transmission signal is received by the reception apparatus 20 shown in FIG. 2. The signal which has reached the antenna 29 is output from the receiver 28 to a channel connected to the decoder 22. Here, because the reception signal has been multiplied by the first diffusion code, the signal which has passed through the first multiplier 63 becomes valid and the signal which has entered the third multiplier 26 becomes invalid. The decoder 22 decodes the received signal and checks whether a code error is present. If no code error is found, the frame is passed to the data terminating block 31 so as to be subjected to a processing. Moreover, the frame is directed to the encoder 66 without setting a retransmission request, and after multiplication by the second diffusion code in the second multiplier 67, the frame is transmitted back by the transmitter 27 to the transmission apparatus 10. On the other hand, if a code error is found, a retransmission request is set in the retransmission request bit 401 before supplied to the encoder 66. The encoder 66 encodes the frame for output. The encoded frame having the retransmission request is multiplied by the second diffusion code in the second multiplier 67 and transmitted by the transmitter 27 from the antenna 29.

The retransmission request transmitted is received by the transmission apparatus 10 in FIG. 1. Hereinafter, explanation will be given, referring to a flowchart of FIG. 4.

The frame having the retransmission request fetched from the receiver 57 is multiplied by the second diffusion code in the second multiplier 58 and then decoded in the decoder 59. The control block 12 fetches the retransmission request bit from the decoded frame and decides whether a retransmission request is present (S2). If a retransmission request is present, the control block 12 causes the decoder 59 to send an instruction for a retransmission to the encoder 1. Upon reception of the retransmission instruction, the encoder 1 reads out a corresponding frame from the storage 2 and outputs the frame to the retransmission channel 7. Here, the gain controller 11 of the retransmission channel 7 is controlled by the control block 12 so that the output signal has the maximum gain. During this operation, the encoder 1 continues transmission of information using the transmission channel 3. The retransmission frame which has been output to the retransmission channel 7 is multiplied by the third diffusion code in the third multiplier 9 (S3) and adjusted by the gain controller 11 so as to be the maximum gain before fed to the adder 54. In the adder 54, a normal transmission frame from the transmission channel is added to the transmission frame from the retransmission channel 7 (hereinafter, referred to as a composite frame) and the resultant composite frame is transmitted from the antenna 56.

On the other hand, if no retransmission request has been set, the corresponding frame is discarded from the storage 2.

The composite frame which has been transmitted is received by the reception apparatus 20 in FIG. 2. The received composite frame is directed from the receiver 28 to the decoder 22. Here, the normal transmission frame is demodulated by the first diffusion code, whereas the retransmission frame is demodulated by the third diffusion code. Accordingly, the first multiplier 63 outputs a normal transmission frame and the third multiplier 26 outputs a retransmission frame. The decoder 22 performs the same processing of a normal transmission frame as has been described above. Moreover, the decoder 22 decodes the retransmission frame and performs the same processing of a normal transmission frame as has been described above.

Figure 5:
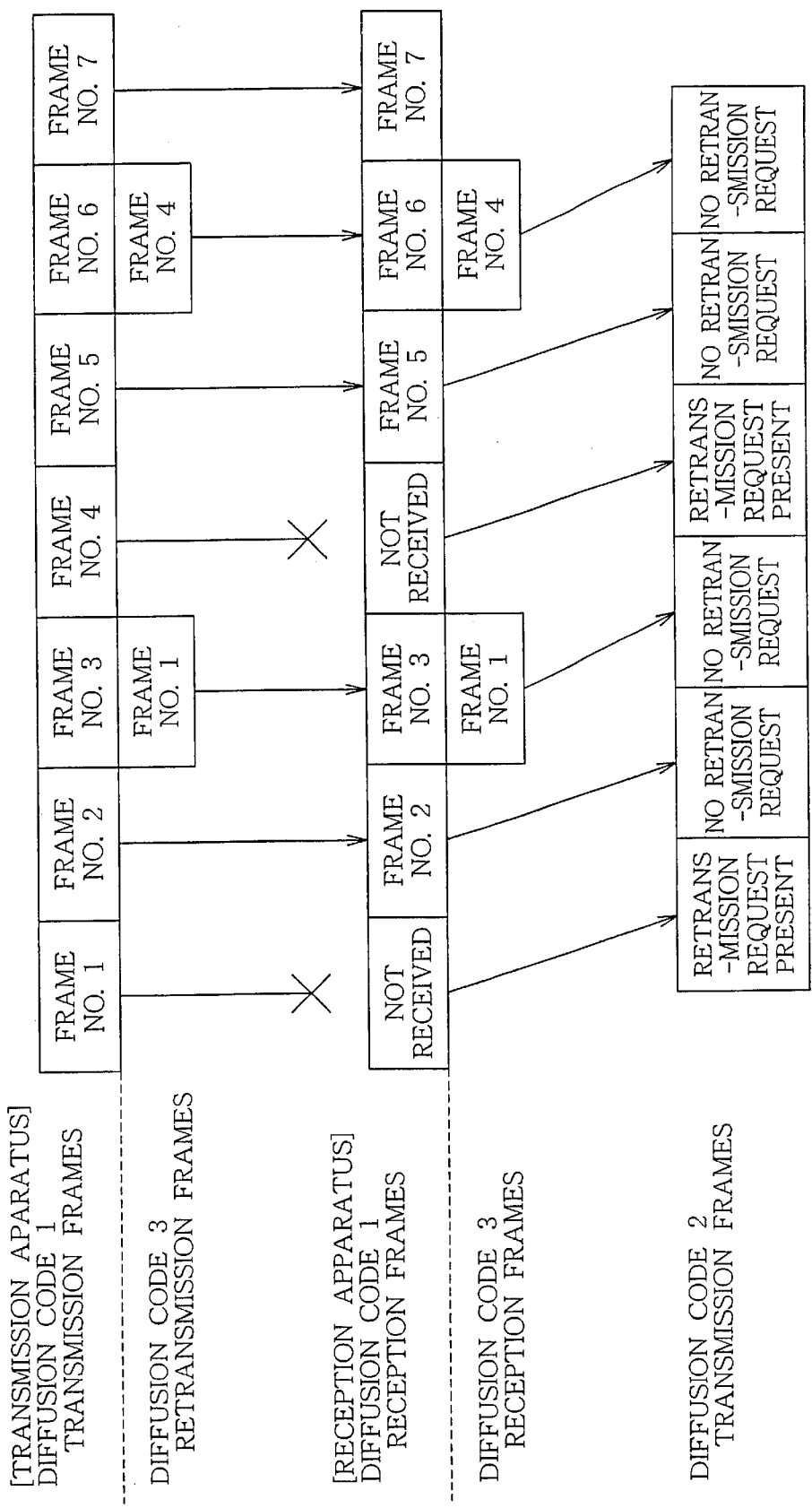
FIG. 5 shows a time chart for passing frames between the transmission apparatus of FIG. 1 and the reception apparatus of FIG. 2.

FIG. 5 shows an example of frame passing between the transmission apparatus 10 and the reception apparatus 20. The transmission apparatus 10 transmits a frame No. 1. If this is not correctly received by the reception apparatus 20, the reception apparatus sets a retransmission request bit for the transmission apparatus 10, during which a frame No. 2 is transmitted from the transmission apparatus 10. After this, the transmission apparatus which has received the retransmission request, continues to transmit a frame No. 3 as a normal operation while retransmitting the frame No. 1 through another channel.

Thus, according to the present embodiment, the transmission apparatus can simultaneously transmit a normal transmission frame and retransmission frame using different channels, and the decoder can process the normal transmission frame and the retransmission frame using separate channels. Accordingly, the transmission apparatus can continue transmission of normal transmission frames without being disturbed by an output of a retransmission frame. This enables to maintain a preferable transmission capacity.

It should be noted that an information generated in the data terminating block 31 to be transmitted to the transmission apparatus 10 is coded by the encoder 66 and multiplied by the second diffusion code in the second multiplier 67 before being transmitted by the transmitter 27 from the antenna 29. This frame is received by the transmission apparatus 10 and demodulated by the second multiplier 58, after which the frame is decoded by the decoder 59 for output to an external line or the like.

The aforementioned embodiment has been described as a relationship between the transmission apparatus 10 and the reception apparatus 20. However, it is also possible, for example, that the reception apparatus 20 is a terminal and the transmission apparatus 10 is a repeater apparatus for transmitting a line signal to that terminal. On the contrary, it is also possible that the transmission apparatus is a terminal and the reception apparatus is a repeater apparatus. In this case, the data terminating block in FIG. 2 is replaced by a line and a line control apparatus or the like. Here, the present invention also includes an apparatus having both of the function of the transmission apparatus and the function of the reception apparatus according to the present invention.

Figure 6:
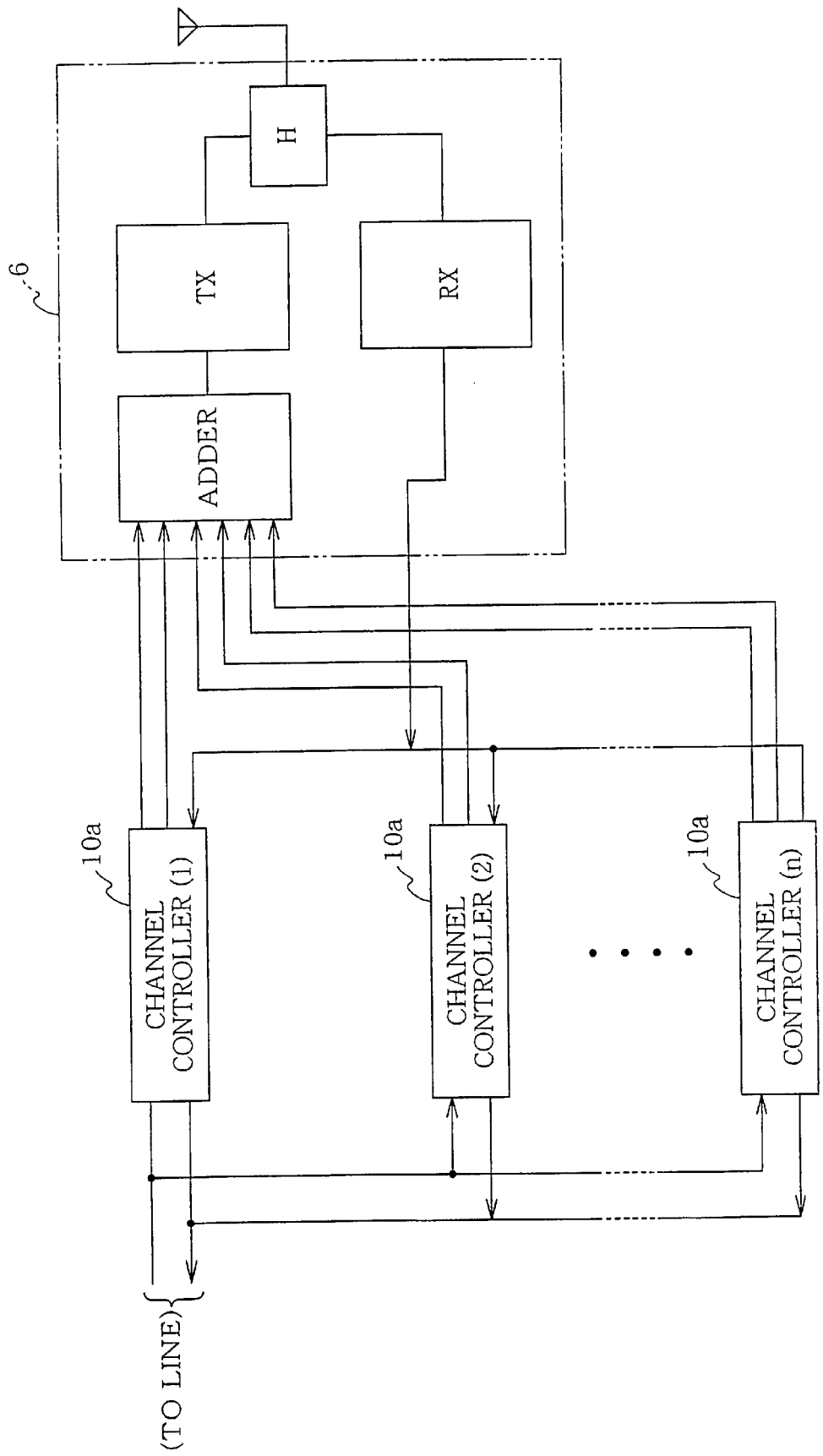
FIG. 6 is a block diagram showing a modified example of the transmission apparatus of FIG. 1.
Figure 7:
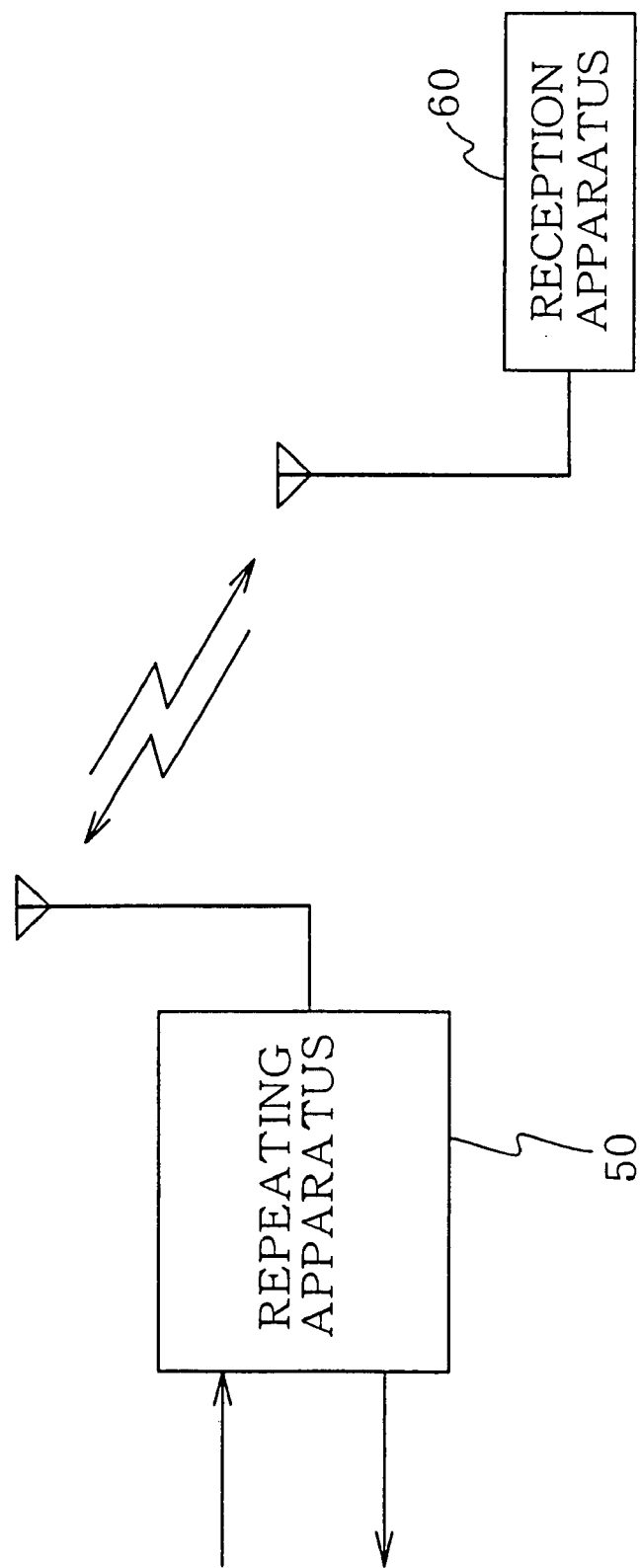
FIG. 7 schematically shows a configuration of a conventional radio communication system.
Figure 8:
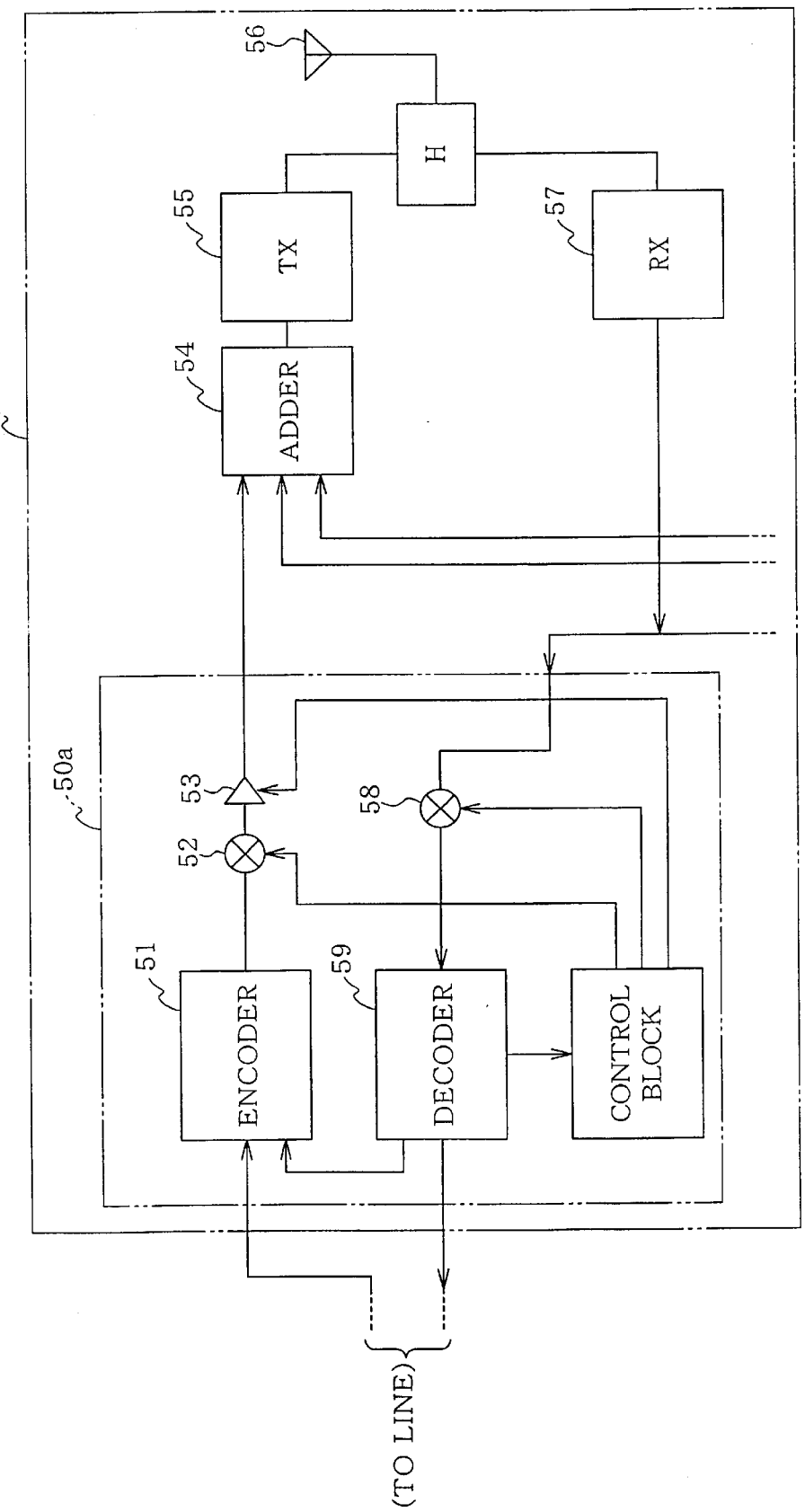
FIG. 8 is a block diagram showing a configuration of the transmission apparatus of FIG. 7.
Figure 9:
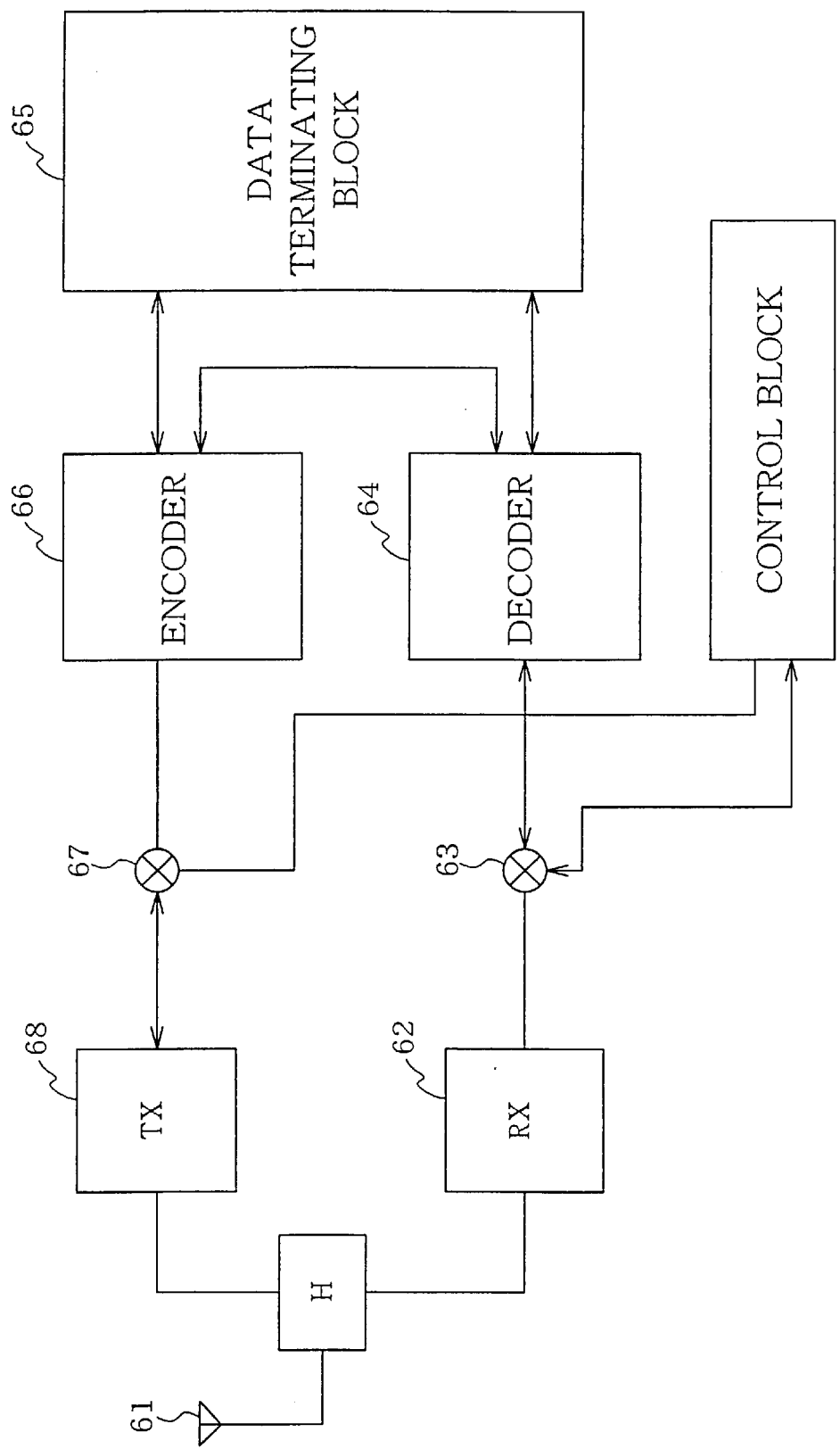
FIG. 9 is a block diagram showing a configuration of the reception apparatus of FIG. 7.
Figure 10:
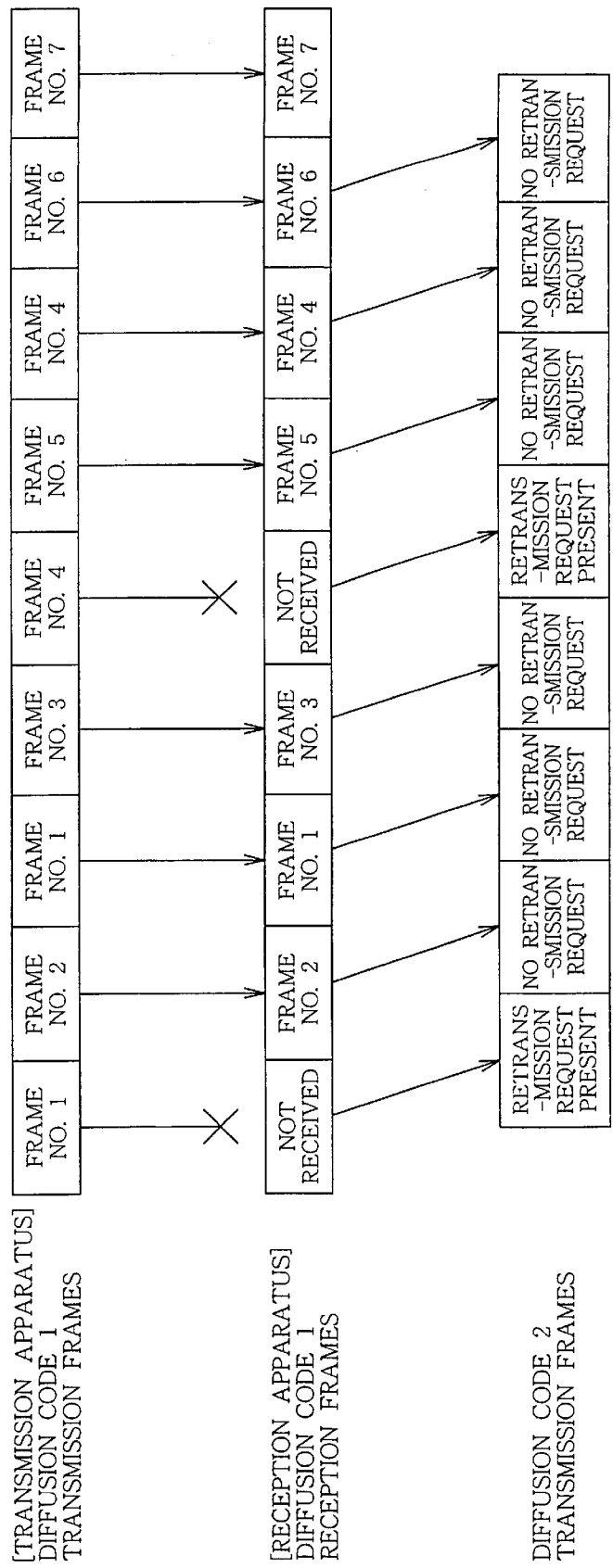
FIG. 10 is a time chart for passing frames between transmission apparatus and the reception apparatus of FIG. 7.

When the transmission apparatus 10 is a repeater apparatus, the transmission apparatus 10 may includes a plurality of channel controller 10a in parallel as shown in FIG. 6. In this case, the respective channel controllers 10a use different diffusion codes so that data transmission and reception of the CDMA method can be performed to/from a plurality of reception apparatuses.

The present invention having the aforementioned configuration enables a transmission apparatus to simultaneously transmit a normal transmission frame and a retransmission frame through different channels and a decoder to process the normal transmission frame and the retransmission frame using separate channels. That is, the transmission apparatus can continue transmission of a normal transmission frame without being disturbed by an output of a retransmission frame. Accordingly, it is possible to maintain a preferable transmission capacity. Besides, if the reception apparatus side checks whether the retransmission frame has a code error and further transmits a retransmission request, it is possible to improve the communication reliability.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-071822 (Filed on Mar. 20$^{th}$, 1998) including specification, claims, drawings and summary are incorporated herein by reference in its entirety.

What is claimed is:

1. A radio communication system comprising a transmission apparatus and a reception apparatus, said transmission apparatus including:
    an encoder for encoding an information to be transmitted and adding an error detection code;
    a storage for storing a signal to be output from said encoder;
    a transmission channel for transmitting said information which has been encoded by said encoder so as to be transmitted;
    a first multiplier provided in said transmission channel, for multiplying an output signal from said encoder by a first diffusion code so as to be a transmission signal destined to said reception apparatus;
    a second multiplier for multiplying a signal received from said reception apparatus, by a second diffusion code;
    a decoder for decoding the output signal from said second multiplier; and
    a transmission/reception block for transmitting and receiving a signal to/from said reception apparatus, and said reception apparatus including:
    a first multiplier for multiplying a reception signal from said transmission apparatus, by the first diffusion code;
    a decoder for decoding an output signal from said first multiplier and checking whether the reception signal contains a code error according to said error detection code;
    an encoder for, upon detection of a code error in said decoder, encoding a retransmission request identifying a frame number which has caused said code error and outputting said retransmission request;
    a second multiplier for multiplying an output signal from said encoder, by the second diffusion code, so as to be a transmission signal destined to said transmission apparatus; and
    a transmission/reception block for transmitting and receiving a signal to/from said transmission apparatus,
    wherein said decoder of said transmission apparatus has a function to instruct said encoder of said transmission apparatus, upon reception of a retransmission request from said reception apparatus, to retransmit the frame to be retransmitted,
    said encoder of said transmission apparatus has a function, in response to the instruction of retransmission, to read out from said storage an information to be retransmitted and a function to output said information to be retransmitted simultaneously with said information to be transmitted,
    said transmission apparatus further including a retransmission channel used only for transmitting the information which has been read out from said storage by said encoder so as to be retransmitted, and a third multiplier provided in said retransmission channel, for multiplying a retransmitted information output signal from said encoder, by a third diffusion code so as to be a retransmitted information in a transmission signal destined to said reception apparatus,
    said transmission channel and said retransmission channel each include a gain controller, both gain controllers being set to maximum when simultaneously processing said information to be retransmitted on said retransmission channel and said information to be transmitted on said transmission channel, and
    said reception apparatus further including a third multiplier for multiplying a reception signal including the retransmitted information from said transmission apparatus by the third diffusion code so as to be an input signal to said decoder of said reception apparatus to generate a decoded retransmitted information.

2. A radio communication system as claimed in claim 1, wherein said encoder of said transmission apparatus has a function for adding an error detection code to said information to be retransmitted and outputting said information to be retransmitted, and
    said decoder of said reception apparatus has a function to check whether a code error is present in the decoded retransmitted information.

3. A transmission apparatus for use in combination with a reception apparatus in a radio communication system, said transmission apparatus comprising:
    an encoder for encoding an information to be transmitted and adding an error detection code to said information encoded;
    a storage for storing a signal produced from said encoder;
    a transmission channel for transmitting said encoded information to be transmitted;
    a first multiplier provided in said transmission channel, for multiplying said output signal from said encoder by a first diffusion code so as to be transmission signal destined to said reception apparatus;
    a second multiplier for multiplying a signal received from said reception apparatus, by a second diffusion code;
    a decoder for decoding an output signal from said second multiplier; and
    a transmission/reception block for transmitting and receiving a signal to/from said reception apparatus,
    wherein said decoder has a function to instruct said encoder, upon reception of a retransmission request from said reception apparatus, to retransmit a frame requested to be retransmitted,
    said encoder has a function, in response to the instruction of retransmission, to read out from said storage an information to be retransmitted and a function to output said information to be retransmitted simultaneously with said information to be transmitted,
    said transmission apparatus further including a retransmission channel used only for transmitting the information which has been read out from said storage by said encoder so as to be retransmitted, and a third multiplier provided in said retransmission channel, for multiplying an output signal from said encoder, by a third diffusion code so as to be a retransmission signal destined to said reception apparatus, said third diffusion code being a code to decode only said retransmission signal, and
    said transmission channel and said retransmission channel each include a gain controller, both gain controllers being set to maximum when simultaneously processing said information to be retransmitted on said retransmission channel and said information to be transmitted on said transmission channel.

4. A transmission apparatus as claimed in claim 3, wherein said encoder has a function to add an error detection code to said information to be retransmitted, before outputting said information.

5. The radio communication system as claimed in claim 3, said reception apparatus comprising:

- a first multiplier for multiplying a reception signal from said transmission apparatus by a first diffusion code;
- a decoder for decoding an output signal from said first multiplier and checking whether a code error is present in the reception signal according to an error detection code;
- an encoder for, upon detection of a code error in said decoder, encoding a retransmission request identifying a frame number which has caused said code error and outputting said retransmission request;
- a second multiplier for multiplying an output signal from said encoder by a second diffusion code so as to be transmission signal destined to said transmission apparatus; and
- a transmission/reception block for transmitting and receiving a signal to/from said transmission apparatus, said reception apparatus further comprising a third multiplier for multiplying the reception signal including a retransmitted information from said transmission apparatus by a third diffusion code so as to be an input signal to said decoder to generate a decoded retransmitted information, wherein said third diffusion code validly passes only the retransmitted information to said decoder.

6. A system of claim 5, wherein said decoder of said reception apparatus has a function to check whether a code error is present in the decoded retransmitted information.

* * * * *